(12) United States Patent
Cao

(10) Patent No.: US 8,279,335 B2
(45) Date of Patent: Oct. 2, 2012

(54) CAMERA APPARATUS FOR PORTABLE ELECTRONIC DEVICE

(75) Inventor: Jin-Ti Cao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 442 days.

(21) Appl. No.: 12/610,487

(22) Filed: Nov. 2, 2009

(65) Prior Publication Data

US 2010/0277640 A1 Nov. 4, 2010

(30) Foreign Application Priority Data

Apr. 30, 2009 (CN) .......................... 2009 1 0302055

(51) Int. Cl.
*H04N 5/225* (2006.01)
*H01J 40/14* (2006.01)

(52) U.S. Cl. ........................................ 348/374; 250/239

(58) Field of Classification Search .......... 348/373–376; 250/239

See application file for complete search history.

(56) References Cited

U.S. PATENT DOCUMENTS

| 8,049,815 | B2 * | 11/2011 | Huang et al. | 348/374 |
| 2008/0143870 | A1 * | 6/2008 | Tanaka et al. | 348/373 |
| 2008/0174692 | A1 * | 7/2008 | Kusaki et al. | 348/374 |
| 2008/0278621 | A1 * | 11/2008 | Cho et al. | 348/374 |
| 2009/0115891 | A1 * | 5/2009 | Ryu et al. | 348/374 |

* cited by examiner

*Primary Examiner* — Chieh M Fan
*Assistant Examiner* — Akshay Trehan
(74) *Attorney, Agent, or Firm* — Altis Law Group, Inc.

(57) ABSTRACT

A camera apparatus is attached to a portable electronic device. The camera apparatus includes an imaging module, a socket and a holder. The imaging module is positioned in the socket. The holder includes a base portion, and two positioning cylinders. The base portion provides a receiving space accommodating the socket and the imaging module, and the positioning cylinders are fixed to the portable electronic device.

9 Claims, 7 Drawing Sheets

CAMERA APPARATUS FOR PORTABLE ELECTRONIC DEVICE

BACKGROUND

1. Technical Field

The present disclosure relates to camera apparatus, and particularly to a camera apparatus for portable electronic devices.

2. Description of Related Art

Camera apparatus are generally included in most portable electronic devices, such as mobile phones, or personal digital assistants, having an imaging function (e.g., still and/or video photography). A conventional camera apparatus is usually held between a housing and a printed circuited board of the portable electronic device.

However, the portable electronic devices usually have a limited space for assembling the camera apparatus therein. Therefore, assembling the camera apparatus is not very convenient. In addition, the arrangement of the camera apparatus limits the extent to which the portable electronic device can be miniaturized and thus also restricting portability. Even if the camera apparatus is compactly assembled, the imaging quality is also greatly degraded.

Therefore, there is room for improvement within the art.

BRIEF DESCRIPTION OF THE DRAWING

Many aspects of the camera apparatus for portable electronic device can be better understood with reference to the following drawings. The components in the drawings are not necessarily drawn to scale, the emphasis instead being placed upon clearly illustrating the principles of the camera apparatus for portable electronic device. Moreover, in the drawings, like reference numerals designate corresponding parts throughout the several views.

DETAILED DESCRIPTION

Figure 1:
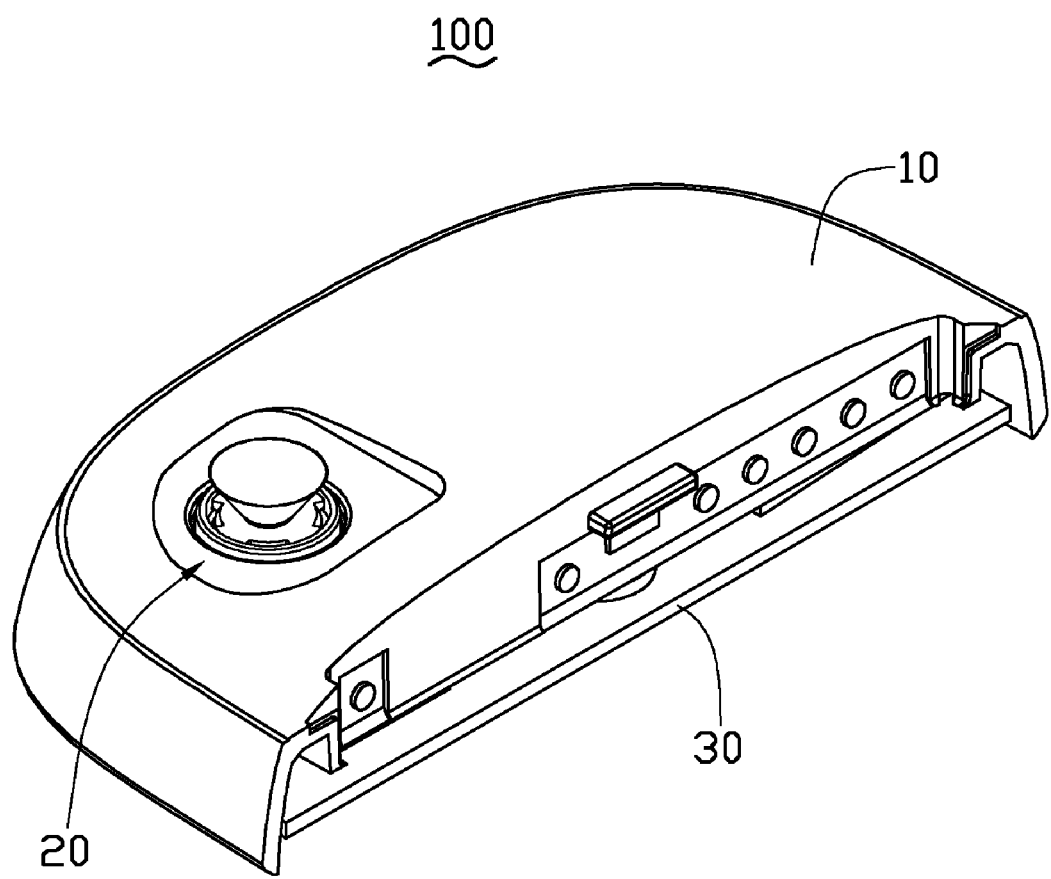
FIG. 1 is an isometric view of a portion of a portable electronic device with a camera apparatus according to an exemplary embodiment.

FIG. 1 shows a portable electronic device 100 (partially shown) includes a housing 10, a camera apparatus 20 and a printed circuited board 30. The camera apparatus 20 is positioned on the printed circuited board 30. The housing 10 is positioned above the printed circuited board 30, and the camera apparatus 20 is sandwiched between the housing 10 and the printed circuited board 30.

Figure 2:
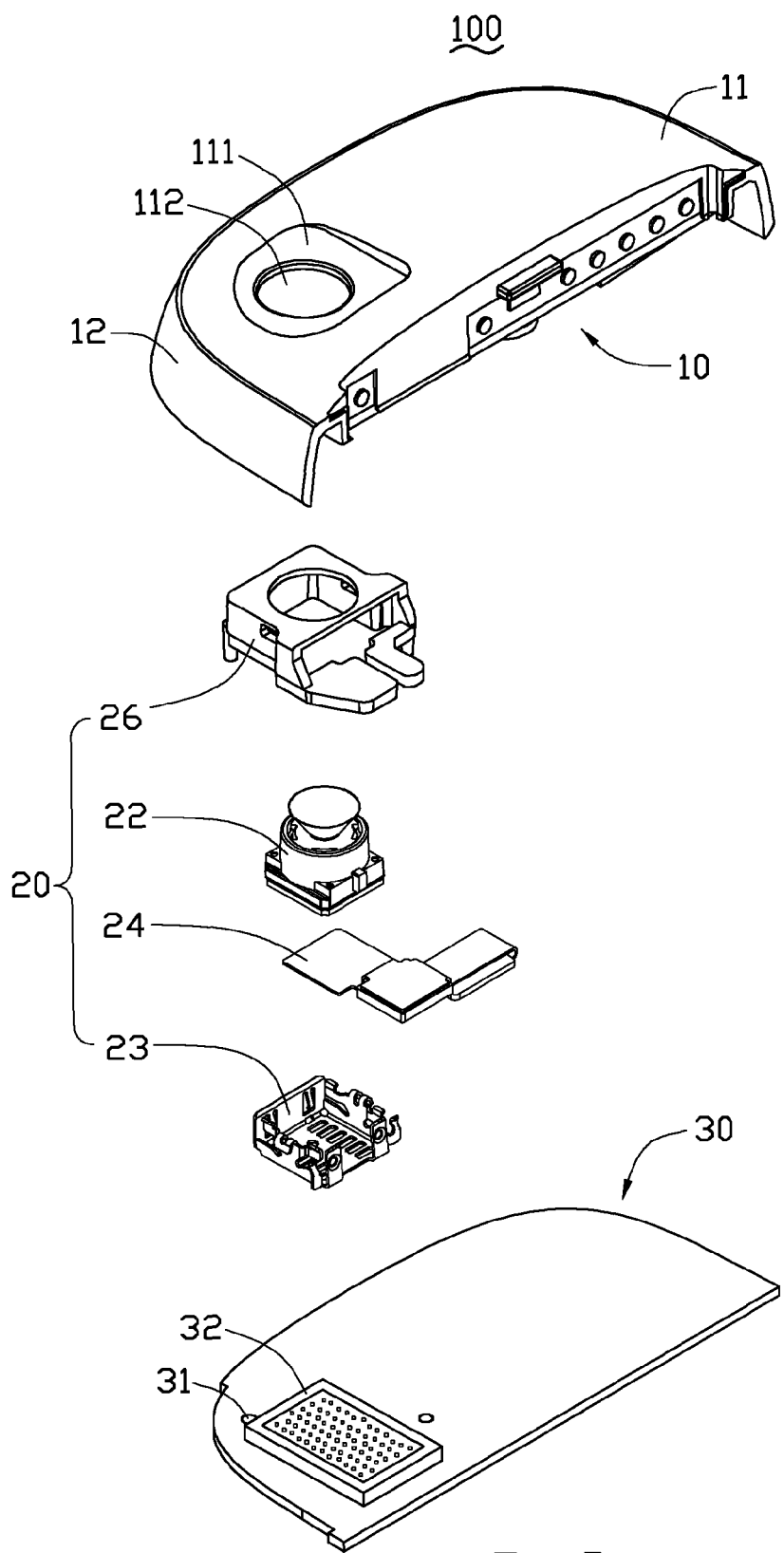
FIG. 2 is an exploded view of the electronic devices shown in FIG. 1.
Figure 3:
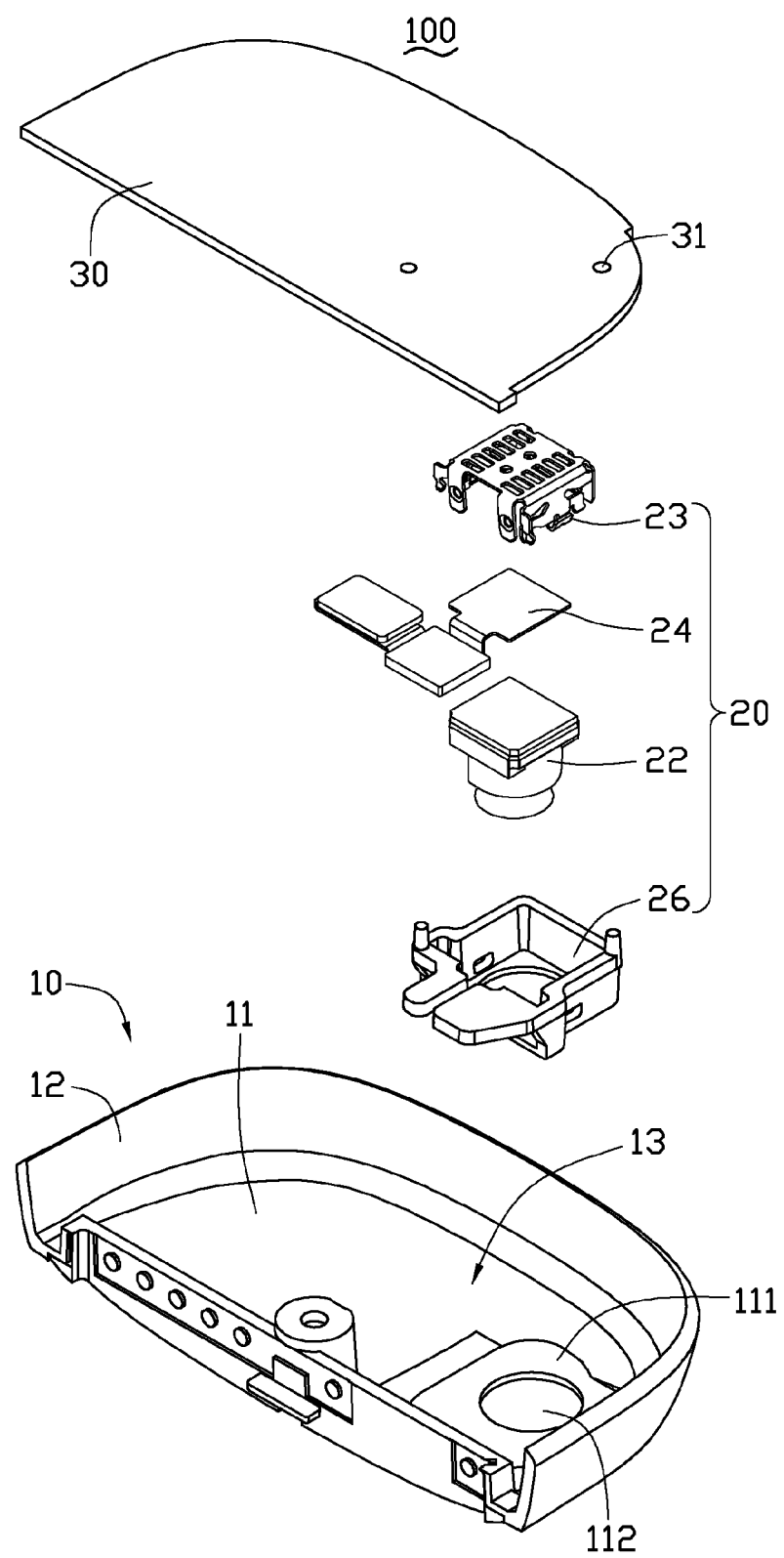
FIG. 3 is similar to FIG. 2, but showing another aspect.

Referring to FIGS. 2 and 3, the housing 10 includes a top portion 11 and a peripheral wall 12. The peripheral wall 12 extends from edges of the top portion 11, thereby defining a cavity 13. The top portion 11 includes an assembled portion 111. The assembled portion 111 defines a hole 112.

Figure 4:
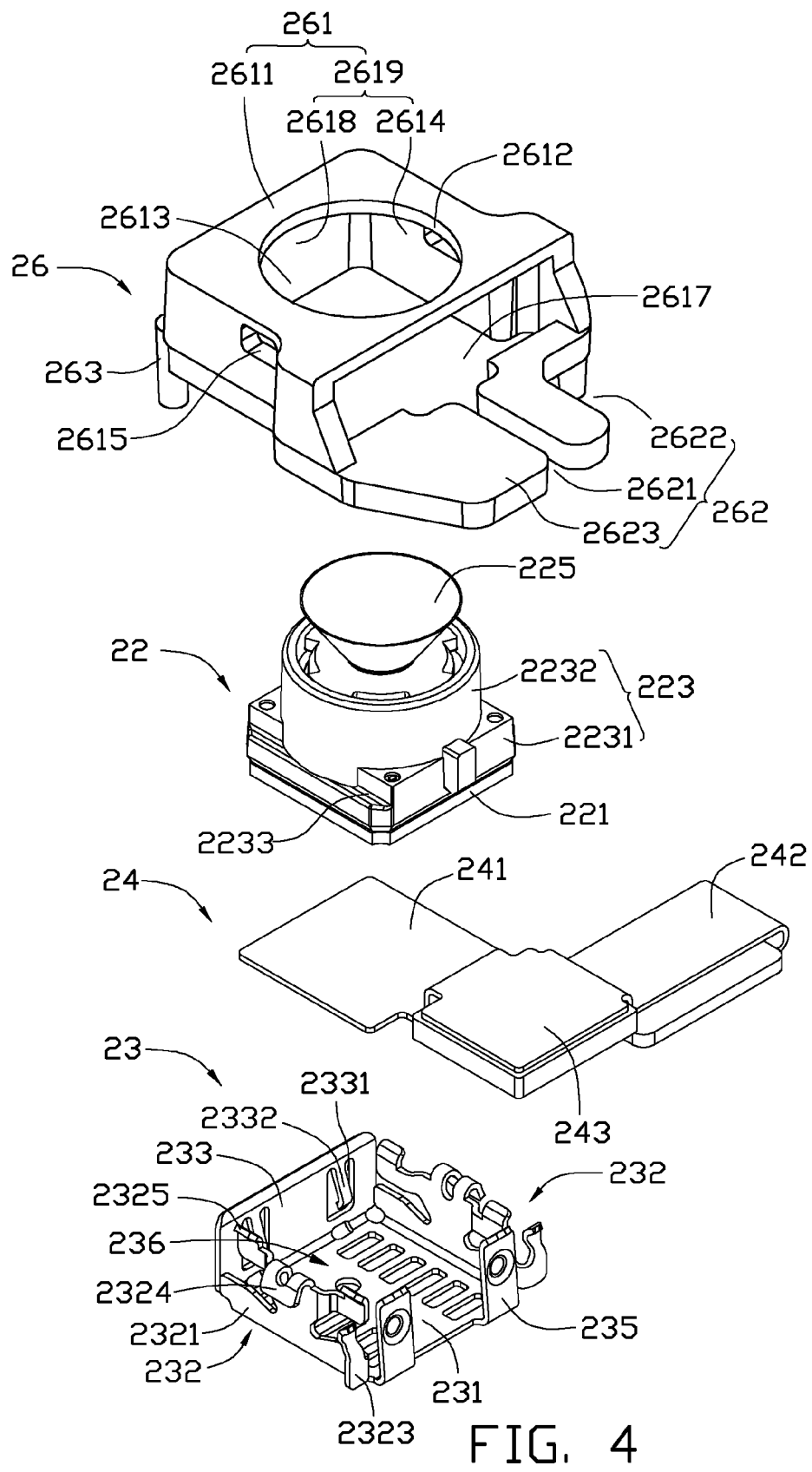
FIG. 4 is an enlarged isometric view of the camera apparatus of FIG. 2.
Figure 5:
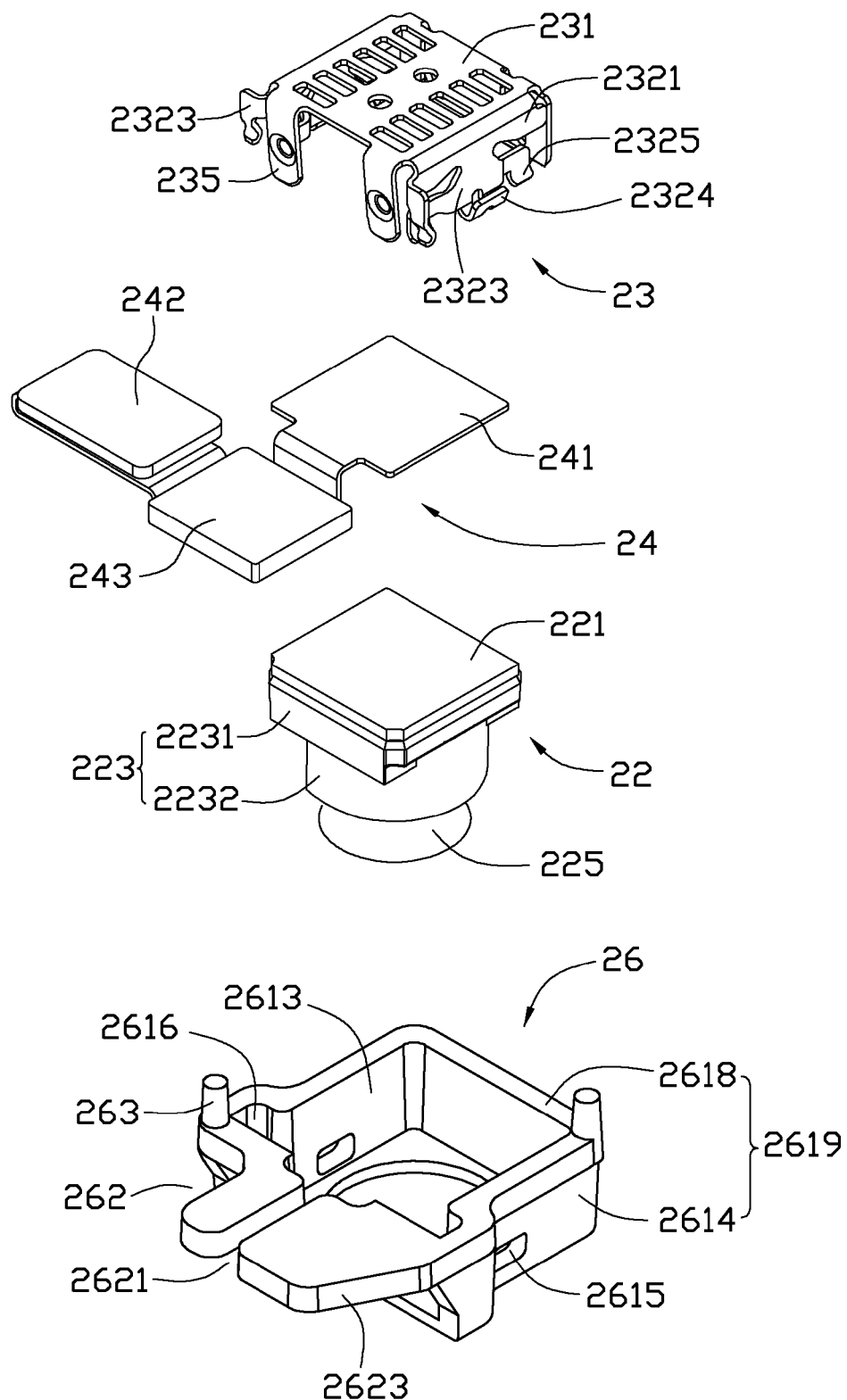
FIG. 5 is similar to FIG. 4, but showing another aspect.

Referring to FIGS. 4 and 5, the camera apparatus 20 includes an imaging module 22, a socket 23, a flex printed circuited board 24 and a holder 26. The imaging module 22 includes an image sensor module 221, a barrel 223 and a lens module 225. The image sensor module 221 provides an image sensor chip (not shown). The barrel 223 includes a flange portion 2231 and a barrel portion 2232 integrally formed together. The flange portion 2231 is positioned on the image sensor module 221. The flange portion 2231 forms a step 2233 at two sides thereof. The barrel portion 2232 is substantially a hollow cylinder, and is used for receiving the lens module 225.

The socket 23 is substantially a cube with an open end. The socket 23 includes a bottom portion 231, two opposite latching walls 232 and a connecting wall 233 extending from the bottom portion 231, thereby defining a socket space 236. Each latching wall 232 includes a main plate 2231, an extending plate 2323, a clamping plate 2324 and two protruding plates 2325. The extending plate 2323 is formed at one side of the main plate 2231. The clamping plate 2324 extends from a middle portion of the main plate 2231. Each protruding plate 2325 extends from one side of the clamping plate 2324. The connecting wall 233 defines two slots 2331 and forms two latching arms 2332 extending into the slots 2332. The latching arms 2332 are angled with the connecting wall 233, and the distal ends of the latching arms 2332 are tilted toward inside of the socket 23. Two spaced latching plates 235 extend up from the bottom portion 232 opposite to the connecting wall 233.

The flex printed circuited board 24 includes a first portion 241, a second portion 243 and a third portion 242. Each of first portion 241 and the third portion 242 are flexibly connected to different edges of the second portion 243.

The holder 26 includes a base portion 261, a support portion 262 and two positioning cylinders 263. The base portion 261 includes a cover 2611 and a peripheral plate 2619 extending from the brim of the cover 2611, thereby defining a receiving space 2613. The cover 2611 defines an aperture 2612. The peripheral plate 2619 is formed on the three edges of the cover 2611, and includes two sidewalls 2614 and one sidewall 2618. Each sidewall 2614 defines a cutout 2615, and a distal end of each sidewall 2614 is recessed toward outside to form a resisting portion 2616. The support portion 262 extends from the resisting portion 2616, and defines an opening 2617 with the cover 2611. The support portion 262 defines a gap 2621, and divides the support portion 262 into two winged portions 2623. One of the wing portions 2623 is substantially L-shaped, and defines a notch 2622. The two positioning cylinders 263 are formed at the cross of the peripheral plate 2619, and are used for being fixed to the printed circuited board 30.

The printed circuited board 30 defines two fixed holes 31. A shielding element 32 is positioned on the printed circuited board 30, and shields the electronic elements under the shielding element 32. The holder 26 may be positioned on the shielding element 32.

Figure 6:
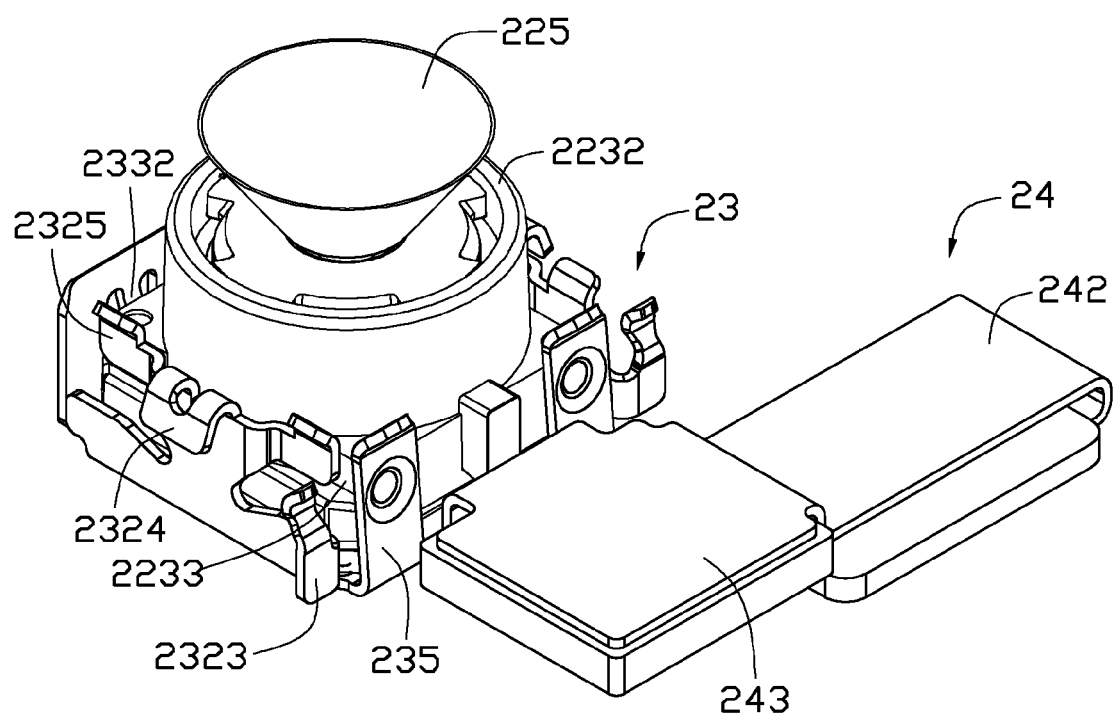
FIG. 6 is a partially assembled view of FIG. 4.
Figure 7:
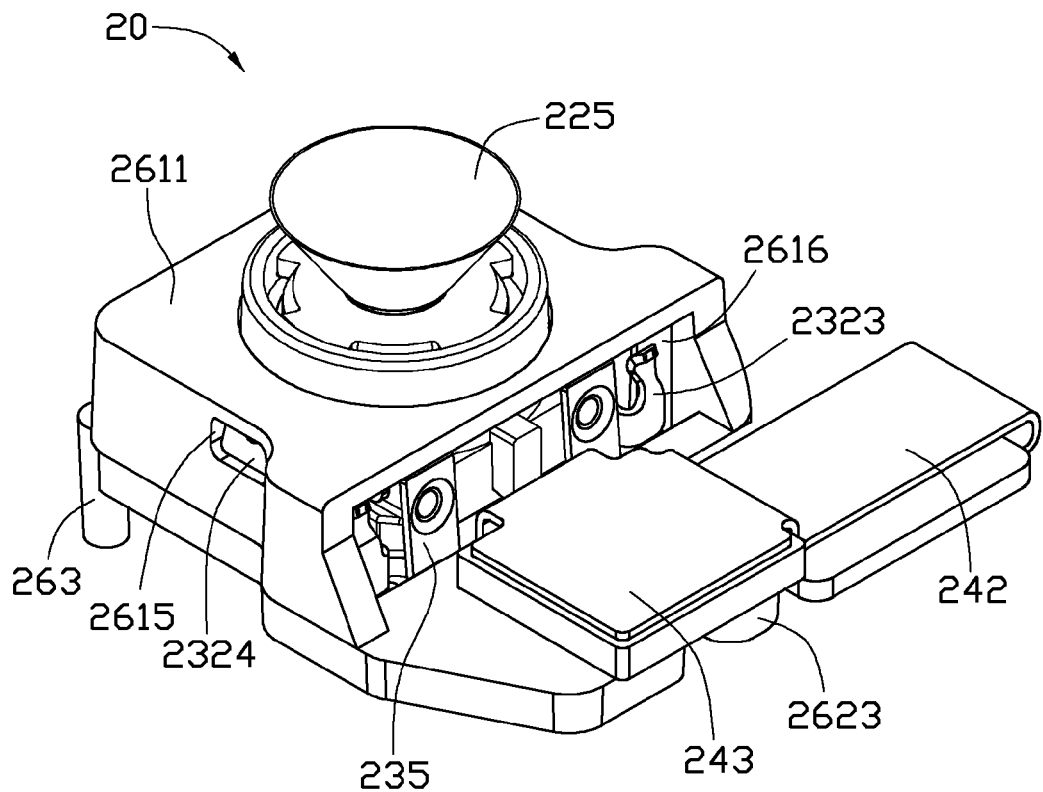
FIG. 7 is an assembled view of FIG. 4.

When assembled, referring to FIGS. 6 and 7, the first portion 241 is firstly inserted into the socked space 236, and is positioned on the bottom portion 231. Then, the imaging module 22 is received in the socket space 236 of the socket 23, and the first portion 241 is positioned between the imaging module 22 and the socket 23. The first portion 242 is electrically connected to the image sensor module 221. The latching arms 2332 and two latching plates 235 respectively clamp two sides of the flange portion 2231, and the protruding plates 2325 respectively clamp the steps 2233 of the other two sides of the flange portion 2231. After that, the holder 26 is placed around the imaging module 22 and the socket 23, the flex printed circuited board 24 is perpendicularly bent to pass through the opening 2617 so that the second portion 243 is supported on the wing portions 2623. The clamping plates 2324 are latched in the cutouts 2615. The extending plates 2323 respectively resist the resisting portions 2616.

When assembling the camera apparatus 20 to the portable electronic device 100, the two positioning cylinders 263 are fixed into the fixed holes 31 of the printed circuited board 30. The socket 23 is positioned on the shielding element 32. Then, the flex printed circuited board 24 is electrically connected to the printed circuited board 30. Finally, the housing 10 is positioned above the printed circuited board 30. The camera apparatus 20 is thus completely assembled to the portable electronic device 100.

The holder helps the camera apparatus be more accurately positioned on the printed circuited board. In addition, the socket 23 is positioned on the shielding element 32 so that the camera apparatus may be disposed on a printed circuited board with many other electronic components.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera apparatus attached to a portable electronic device, comprising:
   an imaging module;
   a socket, the imaging module positioned in the socket;
   a flex printed circuited board including a first portion, a second portion and a third portion; each of the first portion and the third portion flexibly connected to different edges of the second portion, the first portion of the flex printed circuit board positioned between the imaging module and the socket;
   a holder including a base portion, a support portion, and two positioning cylinders, the base portion providing a receiving space accommodating the socket and the imaging module, the support portion including two winged portions, the second portion supported on the winged portions, and the positioning cylinders fixed to the portable electronic device.

2. The camera apparatus as claimed in claim 1, wherein the base portion includes a cover and a peripheral plate extending from the cover, the peripheral plate is formed on the three edges of the cover, thereby defining the receiving space.

3. The camera apparatus as claimed in claim 2, wherein the peripheral plate includes two sidewalls, a distal end of each sidewall is recessed toward outside to form a resisting portion, each winged portion extends from each resisting portion, an opening is defined by the cover, the resisting portions and the winged portions, the second portion and the third portion of the flex printed circuit board are bent to pass through the opening.

4. The camera apparatus as claimed in claim 3, wherein the socket includes a bottom portion, two opposite latching walls, and a connecting wall, the connecting wall extends from the bottom portion, thereby defining a socket space for receiving the imaging module, each latching wall includes a main plate, a clamping plate and two protruding plates extending from the main plate, the clamping plate extends from a middle portion of the main plate, two protruding plates are formed at two sides of the clamping plate, each sidewall defines a cutout, the clamping plates are latched in the cutouts.

5. The camera apparatus as claimed in claim 4, wherein two spaced latching plates extend up from the bottom portion opposite to the connecting wall, the connecting wall defines two slots and forms two latching arms extending into the slots, the latching arms are angled with the connecting wall, and the distal ends of the latching arms are tilted toward inside, the latching arm and the latching plates respectively clamp two sides of the imaging module, the protruding plates respectively clamp another two sides of the imaging module.

6. A portable electronic device, comprising:
   a housing forming an assembling portion;
   a camera apparatus being positioned to the assembling portion, the camera apparatus comprising:
      an imaging module;
      a socket, the imaging module positioned in the socket;
      a flex printed circuited board including a first portion, a second portion and a third portion; each of the first portion and the third portion flexibly connected to different edges of the second portion, the first portion of the flex printed circuit board positioned between the imaging module and the socket;
      a holder including a base portion, a support portion, and two positioning cylinders, the support portion including two winged portions, the second portion supported on the winged portions, the base portion providing a receiving space accommodating the socket and the imaging module,
   a printed circuited board, the positioning cylinders fixed to the printed circuited board, the flex printed circuited board electrically connected to the printed circuited board.

7. The portable electronic device as claimed in claim 6, wherein the base portion includes a cover and a peripheral plate extending from the cover, the peripheral plate is formed on the three edges of the cover, the peripheral plate includes two sidewalls, a distal end of each sidewall is recessed toward outside to form a resisting portion, each winged portion extends from each resisting portion, an opening is defined by the cover, the resisting portions and the winged portions, the second portion and the third portion of the flex printed circuit board are bent to pass through the opening.

8. The portable electronic device as claimed in claim 7, wherein the socket includes a bottom portion, two opposite latching walls, and a connecting wall, the connecting wall extends from the bottom portion, thereby defining a socket space for receiving the imaging module, each latching wall includes a main plate, a clamping plate and two protruding plates extending from the main plate, the clamping plate extends from a middle portion of the main plate, two protruding plates are formed at two sides of the clamping plate, each sidewall defines a cutout, the clamping plates are latched in the cutouts.

9. The portable electronic device as claimed in claim 8, wherein two spaced latching plates extend up from the bottom portion opposite to the connecting wall, the connecting wall defines two slots and forms two latching arms extending into the slots, the latching arms are angled with the connecting wall, and the distal ends of the latching arms are tilted toward inside, the latching arm and the latching plates respectively clamp two sides of the imaging module, the protruding plates respectively clamp another two sides of the imaging module.

* * * * *